UNITED STATES PATENT OFFICE 2,414,417

PRODUCTION OF HEAT-REACTIVE RESINOUS PRODUCTS

Arthur J. Norton, Seattle, Wash., assignor to Pennsylvania Coal Products Company, Petrolia, Pa., a corporation of Pennsylvania No Drawing. Application February 25, 1944, Serial No. 523,919

22 Claims. (Cl. 260—18)

This invention relates to the production of a resinous product by reacting a dihydroxy benzene and a vegetable oil containing a major proportion of unsaturated glycerides, said vegetable oils, in the preferred form of the invention, containing about 40% to about 60% of trilinolein. More specifically, the present invention is directed to the production of resin-like compounds by reacting resorcin with vegetable oils containing a major proportion of unsaturated glycerides, said vegetable oils preferably having present about 40% to about 60% of trilinolein.

In the preferred form of the invention, the dihydroxy benzene, as, for example, resorcin, is reacted with soya bean oil or cottonseed oil, which are examples of vegetable oils containing between 40% and 60% of trilinolein calculated on a basis of total fatty acids as 100% and not as glycerides.

The resin-like products produced in accordance with the present invention, in their hardened, set-up form, are characterized by the property of resisting oxidation on aging; and because oxidation does not occur the hardened, set-up products do not become brittle on aging.

It is well known that phenols may be combined with vegetable drying oils in the presence of satisfactory catalysts to produce both substituted phenols and phenolated oils having utility in the coating arts. However, the reaction products of said vegetable drying oils with phenols have several disadvantages when used as coating media, in that the coating becomes brittle and begins to crack and peel. In other words, as the coating ages it loses its flexibility. Most of the phenol-drying oil reaction products are "siccative" compositions, that is, the reaction products dry in the presence of oxygen, and usually with the assistance of a dryer typified by lead, cobalt, and manganese naphthenates. The process of drying or oxidation does not cease when the desired cure has been obtained, but said oxidation extends over a period of years, and the coating eventually becomes hard and brittle.

The principal vegetable oils which have been reacted with phenols are drying and semi-drying oils, such as tung or China-wood oil, linseed oil, oiticica oil, and, less frequently, blown castor oil, rapeseed oil, and Perilla oil. It has previously been proposed to prevent embrittlement by oxidation over relatively long periods of time by combining with the vegetable oil a sufficient amount of phenolic body so that the double bonds of the vegetable oil were sufficiently saturated to resist oxidation and embrittlement. While this object was attained, the product produced was not successful because it did not properly harden on baking in the presence of oxygen and dryers.

Where a large amount of phenolic body is used, in order that the double bonds of the vegetable oil were sufficiently saturated to resist oxidation when the resulting product was hardened by the use of a methylene hardening agent, such as hexamethylenetetramine, the resulting product was usually too hard and was lacking in flexibility, and therefore its value as a coating material was greatly reduced.

When only a portion of the unsaturated bonds of the oil compound was reacted with the phenolic body, the end product, while capable of air-drying by oxidation, had the disadvantage of continuing to air-dry over relatively long periods of time, and as the coating aged it became brittle and finally substantially ceased to function satisfactorily as a coating medium.

It has been discovered that if a dihydroxy benzene, and, more specifically, resorcin, is reacted with a vegetable oil containing unsaturated compounds, under the conditions hereinafter set forth, the resulting product in its hardened, set-up state may be employed as a coating medium and will resist oxidation, and therefore will not become brittle during aging for a relatively long period of time. In accordance with the present invention, the dihydroxy benzene, as, for example, resorcin, is reacted with an unsaturated vegetable oil, and, more particularly, a vegetable oil containing 40% to 60% of trilinolein in the presence of a sulphuric acid catalyst present in an amount varying between 7½% and 15%. As herein pointed out, sulphuric acid is the only catalyst which gives satisfactory results and therefore may be considered a critical catalyst.

It has further been discovered that, in the preferred form of the invention, it is necessary to react the ingredients at a temperature of about 175° to 200° C. As will hereinafter be pointed out, the preferred product is not obtained if the temperature is much below or above the temperature range specified.

In the preferred form of the invention, the amount of resorcin which is reacted with the unsaturated vegetable oil varies from 2 parts of the resorcin to 1 of the oil to 1 part of resorcin to 2 of the oil. If these proportions are substantially departed from, then the final reaction product will not have the desired characteristics.

In order that the invention may be more clearly understood, the following examples are set forth by way of illustration and not by way of limitation:

Example I

A mixture is made of the following ingredients in the proportions specified:

| | Grams |
|---|---|
| Resorcin | 60 |
| Soya bean oil | 240 |
| Concentrated sulphuric acid (98%) | 6 |

The above ingredients are mixed together at room temperature, that is, at a temperature varying between 20° and 30° C. and thereafter warmed until the mixture gradually becomes a substantially homogeneous liquid. Warming is continued until exothermic reaction sets in. Usually, it is sufficient to warm or heat the homogeneous liquid to a temperature varying from about 120° to about 130° C., at which point the exothermic reaction is initiated. Usually the exothermic reaction will carry the temperature up to between about 135° and about 150° C. Where a large mass of the reactants is used, the effect of the exothermic reaction will be to increase the temperature of the reactants and the temperature rise may be as much as 50° to 60° C.

It is desired to point out that the reaction is accompanied by an evolution of sulphur dioxide, and the evolution of this gas is one of the evidences of the extent of the reaction. It is desirable that the reaction proceed until the $SO_2$ is substantially eliminated, and usually this elimination will be substantially completed if the reacting mass is heated to a temperature varying from about 175° to about 200° C., at which temperature range the evolution of sulphur dioxide is substantially completed. Active heating of the mass is then stopped and the reaction product is cooled to room temperature, that is, to about 20° to about 30° C., or until the cooled resinous mass assumes a viscous, sticky condition, that is, is in the form of a thick liquid which may be removed from the reaction vessel and later on used in its viscous liquid state; or, in the alternative, the viscous mass may be thinned, as by the use of a solvent or by heating, and used as a coating material.

Example II

The following reacting ingredients were mixed at room temperature and warmed as set forth in Example I until an exothermic reaction was initiated:

| | Grams |
|---|---|
| Resorcin | 100 |
| Cottonseed oil | 200 |
| 98% sulphuric acid | 10 |

In a batch of the size set forth the exothermic reaction causes a temperature increase of 15° to 20° C., and simultaneously sulphur dioxide is eliminated. When the exothermic reaction between the above ingredients has been substantially completed, heating is resumed until the bulk of the sulphur dioxide is eliminated, and this usually occurs at a temperature of 175° to 200° C. In a batch of the size set forth the reaction between the constituents and the substantially complete liberation of the sulphur dioxide is completed in from about 1 to 2 hours, depending on the rate at which the material is heated. This time limit is by way of illustration and not by way of limitation, as obviously many factors will influence the duration of the reaction. The point which it is wished to emphasize is that the reaction should be substantially complete and the sulphur dioxide should be substantially removed.

The following is an additional example illustrative of the present invention:

Example III

| | Grams |
|---|---|
| Resorcin | 100 |
| Cottonseed oil | 100 |
| 98% sulphuric acid | 10 |

The reactants are mixed at room temperature and the reaction is carried out substantially as set forth in Examples I and II.

An additional example is as follows:

Example IV

| | Grams |
|---|---|
| Resorcin | 200 |
| Soya bean oil | 100 |
| 98% sulphuric acid | 20 |

The above reactants are mixed and heated as set forth in Examples I to III.

An additional example is as follows:

Example V

| | Grams |
|---|---|
| Resorcin | 200 |
| Cottonseed oil | 50 |
| 98% sulphuric acid | 20 |

The reactants are mixed at room temperature and heated to about 175° to 200° C. in the manner hereinbefore set forth.

It may be pointed out that the reaction products produced in accordance with the preceding examples are all heavy, sticky, dark, red-brown, viscous, resinous masses with a viscosity increasing from a heavy liquid, in Example I, to an almost brittle, grindable product, in Example V. The reaction product produced from the mixture set forth in Example V will fracture when struck a sharp blow at room temperatures, but on slow, steady application of pressure will "cold flow" or deform.

It may be pointed out that the cottonseed oil and the soya bean oil set forth in the preceding examples are illustrative of the vegetable oils containing from 40% to 60% of the unsaturated glyceride, trilinolein; and other vegetable oils containing trilinolein in these proportions may be substituted for cottonseed oil and soya bean oil. The iodine number of the cottonseed oil and soya bean oil containing 40% to 60% of trilinolein varies between about 105 and about 135, the iodine value of these oils being an indication of the unsaturated state of the oil. Animal oils having an equivalent state of unsaturation containing 40% to 60% of trilinolein may be used in place of the vegetable oils. Whale oil, having an iodine number of 120, may be used. Vegetable oils containing glycerides of fatty acids having 3 double bonds, as, for example, tung oil, when mixed with resorcin and a catalyst, produce compounds which often gel under reaction conditions, and even when gelling does not occur the tung oil resorcin reaction products when used in their hardened state as a coating composition often exhibit a substantial degree of brittleness, which, of course, is fatal to the use of the coating material from the standpoint of long life. On the other hand, when resorcin and a vegetable oil containing a high percentage of triolein are reacted, the resulting reaction product is not sufficiently reactive so that it may be cured to a non-tacky, flexible state. Triolein is also known as the glyceride of oleic acid, the latter being characterized by only one double bond. An oil illustrative of an oil containing a large proportion of a glyceride of oleic acid having only one double bond is olive oil.

In view of the above, from the standpoint of a controllable reaction, resulting in a resinous reaction product which may be cured to a permanently flexible, non-tacky, insoluble end product, it is highly desirable, if not necessary, that the resorcin or other polyhydric phenol be reacted with a vegetable oil containing between about 40% and about 60% of trilinolein.

It has previously been proposed to react tung oil with resorcin in the presence of a catalyst such as hydrochloric acid, phosphoric acid, zinc chloride, aluminum chloride, and the like. However, in carrying out the present invention, catalysts of the above type are not suitable, and equivalent results have not been obtained by the use thereof. Therefore, in carrying out the present invention, the use of sulphuric acid as a catalyst is critical. Further, it may be pointed out that in the examples set forth the sulphuric acid is employed in an amount equivalent to 10% taken on the weight of the resorcin used in carrying out the reaction. This figure applies to 98% sulphuric acid. While the amount of sulphuric acid used may vary, as a practical matter, between about 7½% to about 15% of sulphuric acid, preferably 98% sulphuric acid, are the lower and upper limits of the amounts of acid which may be employed in carrying out the reaction and still obtain a desirable product. The preferred results are obtained when about 10% of sulphuric acid taken on the weight of the resorcin is used. While the experiments are carried out with 98% sulphuric acid, either 93% sulphuric acid or oleum may be used. When 93% sulphuric acid is used the limits may be expanded a little, but not very much, and when oleum is used the limits may be contracted somewhat, but, here again, not in any substantial manner. When less than about 7½% of sulphuric acid is present in the reacting mixture, reaction tends to progress too slowly, with the resulting reaction product having an increased tendency towards embrittlement on aging after being cured, as, for example, in the manner hereinafter set forth. If larger quantities than 15% are used, the reaction will progress too rapidly, and often gel prior to the substantial elimination of sulphur dioxide vapor from the mass. As the exact function of the sulphuric acid catalyst is not understood, and as it is quite evident that from 40% to 70% of the sulphuric acid employed is broken down in the reaction, as evidenced by quantitative collection of the liberated $SO_2$, it has been determined that the best product is formed when the liberated $SO_2$ is substantially completely removed from the reaction mass. It has been found that the substantial elimination of $SO_2$ gas is accomplished by the time the reaction mass is heated to a temperature ranging between 175° and 200° C. Therefore, in a sense, this temperature range may be considered critical. It may be stated that when temperatures substantially over 200° C. are employed the reaction mass rapidly increases in viscosity, and the increase is so rapid that the reaction mass gels and becomes insoluble in both spirit and hydrocarbon solvents. Therefore, a temperature range of over 200° C. could be used to eliminate $SO_2$, but this is restricted by the increase in viscosity and the tendency of the reaction product to gel. Therefore, both from the standpoint of liberation of sulphur dioxide and a product which is not too viscous and does not gel during the reaction, and particularly during the last stages thereof, this particular temperature range of 175° to 200° C. may be considered critical.

In order that the value of the coating composition of the present invention may be clearly understood, the following is set forth:

A simple test which has been developed to determine the efficiency of resin compounds as flexible coating agents has been to coat a thin sheet of metal with the desired material, cure it, and then examine the cured, coated metal sheet for flexibility and durability as well as for adhesion of the coating. The products produced in Examples I to V were tested in the above manner. More specifically, the products of each of the examples were treated at a temperature varying from between about 80° and about 130° C. for a period of time such that the melted product had a viscosity of about T to U on the Gardner viscometer. A sheet of 5 mil copper (.005 inch thick) was cut into strips approximately 3 inches by 1 inch, and into each molten reaction product of Examples I to V there was introduced one of the copper strips. Each copper strip was then suspended and cured in an oven maintained at 115° to 130° C. for 2 hours, after which the strips were removed and each strip dipped in the same liquid molten product with which it had been coated about two hours earlier. The test specimens were then rehung in the oven for another period of about 2 hours at which time they were removed and examined.

The results of the examination indicated that the coatings of the copper strips, with the exception of those prepared from the product of Example I, were non-tacky and apparently well cured. The test specimens coated with the product produced in accordance with Example I were still sticky and in general indicated a lack of cure. When the cooled test specimens were flexed, the specimens which had been coated with the reaction product produced in accordance with Example V showed some tendency to crack and peel because of brittleness, which on continued flexing developed failure in the coated film. The coatings which resulted from coating the copper plates with the reaction products of Examples II, III and IV, said coatings having been cured in the manner above set forth, showed good flexibility and excellent adhesion.

It may be pointed out that the weight ratio between resorcin and vegetable oil changes in the five examples such that in Example I the ratio by weight of resorcin to the oil is 1 to 4; in Example II it is 1 to 2; in Example III, it is 1 to 1; in example IV it is 2 to 1; and in Example V it is 4 to 1.

The tests above set forth clearly show that the coating compounds formed when the ratios of resorcin to oil are 1 to 4 and 4 to 1 are of relatively little value when it is desired that the coating composition bake or cure to a non-tacky, flexible film in a reasonable length of time and at a curing temperature which in itself inhibits embrittlement of the cured coating material. By a reasonable length of time is meant about 2 to 3 hours, and the curing temperature is usually between 115° and 130° C. If the temperature is raised above 135° C., there is a tendency for resorcin-oil reaction product to polymerize in its solid state and cause the resulting film or coating to be highly brittle. When the weight of resorcin to oil is 4 of the former to 1 of the latter, the resulting reaction product cures to a brittle, relatively non-flexible coating or film, and therefore that ratio of reacting materials is entirely unsatisfactory. When the resorcin and oil ratio is 1 of the former to 4 of the latter, it is possible to cure the resulting reaction product to a fairly good coating material, but it takes about 2 to 3 times as long as when the ratios are those set forth in Examples II to IV inclusive, or in the range established by the said examples.

Additional tests show that where the ratio of resorcin to oil is in one case 1 to 3, and in another case 3 to 1, the reaction products are somewhat improved over the reaction products produced by proceeding in accordance with Examples I and V, but these reaction products, from the standpoint of flexibility and degree of cure were not as satisfactory as the products produced by proceeding in accordance with Examples II to IV. Therefore, broadly stated, in producing coating compositions the ratio of resorcin to oil may vary between 1 of resorcin to 3 of the oil, and 3 of the resorcin to 1 of the oil, and preferably should vary from between 1 of the resorcin to 2 of the oil and 2 of the resorcin to 1 of the oil.

It is desired to point out that the liquid resinous coating which was applied to the copper strips above referred to did not have present any setting agent, and the liquid coating composition did not have any solvent present. The coating composition is employed in the above form of the invention in substantially the state in which it is produced, subject to the limitation that the material is warmed so that it assumes a molten state having a suitable viscosity, but preferably a viscosity varying from about T to U on the Gardner viscometer, so that the solution assumes a state whereby it is suitable for the dipping of articles, said articles frequently being provided with a fibrous protective sheath, such as is usually used in the insulation of electrical conductors. The resinous liquid coating material produced as above set forth is of great value as an insulating coating on electric coils and the like. For example, it may be desired to insulate a wound field coil for a street-car motor or the like, in which case the reaction product produced in accordance with Example II is heated to about 70° to about 80° C. until it becomes molten and of a suitable viscosity. The field coil is then placed in the hot bath and maintained therein for a suitable length of time, as, for example, 10 minutes, and at the end of this time period the coil is removed from the bath and allowed to drain. The field coil, which may be made up of a series of copper conductors, which may or may not carry a fibrous insulating sheath, is, by the above procedure, coated or impregnated with a resinous coating material free of solvent. The so-treated coil may be then transferred to an oven and heated therein at a temperature of about 115° to about 130° C. for about 2 hours. Ordinarily, two coats are applied, and the second coat upon application will not "raise" or react on or with the first coating even during and after the second baking step. The second coating does very adequately key to the first coating. The so-treated electrical conductor is characterized by a flexible, durable, dielectric coating of great value, lasting four to five times as long as the coatings of coils which have been treated with the phenol-oil products of the prior art.

The relative value of various coating materials with respect to embrittlement with age is, in general, determined by heating specimens prepared as hereinbefore set forth from room temperature to 200° C. and allowing them to immediately cool down to room temperature. The alternate rise and fall in temperature simulates the conditions actually encountered when an object such as a field coil is in use. It may be stated that the materials of the prior art hereinbefore referred to may be heated four or five times up to 200° C. and allowed to cool before the coating will break when bent around a ⅛-inch mandrel. On the contrary, using the coating materials of the present invention, the hardened and cured coatings give satisfactory flexibility tests even after 20 heating cycles; that is, after 20 heating cycles of the character set forth the hardened and cured coating does not break or peel.

It has been previously stated that the coating materials of the present invention are useful not only in the coating art but are also useful when employed with a methylene-containing setting agent such as hexamethylenetetramine and various other fields well known in the resin art. For example, the compositions herein disclosed may be used in the manufacture of laminated articles, plywood, and cold-molded articles. When used for these purposes it has been found satisfactory to employ the resinous reaction product produced by the reaction of resorcin with a vegetable oil containing between about 40% and about 60% of trilinolein as varnishes. However, the incorporation of the setting agent in these varnishes, particularly when hexamethylenetetramine is employed, offers considerable difficulty because of the lack of solubility of the hexamethylenetetramine in a suitable varnish, as, for example, an alcohol varnish employed as a solvent component, denatured ethyl alcohol or an equivalent material. However, it has been ascertained that by carefully controlling a solution of hexamethylenetetramine in water it is possible to add a water solution of the hexamethylenetetramine to the varnish, as, for example, an alcohol varnish of the oil-resorcin reaction product herein set forth, and achieve a homogeneous liquid impregnating solution, said oil-resorcin product being produced by reacting resorcin and oil containing 40% to 60% of trilinolein in the ratio varying between 1 part of resorcin to 3 parts of oil, and 3 parts of resorcin to 1 part of oil, and preferably in the ratio varying between 1 part of resorcin to 2 parts of oil and 2 parts of resorcin to 1 part of oil.

In order that this may be clearly understood, the following examples are set forth:

The product produced in any of the foregoing examples is heated to a temperature varying between 70° to 80° C., so that liquid is produced which may be easily agitated or stirred. To the warm liquid there may be gradually added, with constant stirring, a given quantity of solvent, as, for example, alcohol, the solvent being, for example, equal in weight to the weight of the resin, although other ratios of resin to solvent may clearly be used. The resulting alcohol solution is then cooled to provide a solution of very low viscosity, that is, a liquid which is slightly more viscous than water. Usually, it is necessary to cool to room temperature, that is, between 20° and 30° C., but obviously this temperature may be varied in order to produce the desired stated result. Prior to the use as an impregnating agent of the resin solution produced as above set forth, an amount of hexamethylenetetramine dissolved in approximately an equal amount of water is slowly added to the alcohol solution of the resin, the solution being preferably agitated, as by stirring, during the addition of the methylene-containing setting agent to thereby produce a homogeneous varnish which shows no tendency to separate into layers after standing for several hours, as, for example, 3 to 4 hours. It has been found that the amount of methylene-containing setting agent, as, for example, hexamethylene tetramine, which may be employed as a setting agent for said varnishes may vary within rather wide limits, as, for example, from 2% to as high as 15% or 20% based on the weight of the resin solids present in the alcohol solution. However, preferably the setting agent may be used in an amount equivalent to about 2% to about 12% or 15% taken on the weight of the resin solids present in the alcohol solution of the resin.

In order to determine the relative curing time of the reaction products produced in accordance with Examples I to V and the equivalent reaction products, when said reaction products are mixed with a curing agent and used as an impregnating material, the materials so-prepared have been subjected to the following tests:

A varnish is prepared comprising the resorcin-oil resinous reaction product, together with an equal amount of alcohol and 10% of hexamethylenetetramine based on the weight of the resin solids, and the resulting solution is then tested on a hot plate to determine the time of cure. When cured, a sample of the film is removed from the hot test plate as by stripping, and examined for flexibility and toughness. More specifically, the test may be carried out by placing small samples of the varnish on an electric hot plate heated to about 135° C. By means of a stop-watch, the time is observed which is required for the liquid film to assume its hardened and set-up state, when it is commonly stated to be cured. Employing the reaction products produced in accordance with Examples I to V and incorporating therein alcohol and hexamethylenetetramine in the amounts previously set forth, and employing the test procedure referred to, the following times of cure were observed:

| Test No. | Resorcin-oil ratio | Cure time in seconds 135° C. | Quality of film |
| --- | --- | --- | --- |
| A | 4 to 1 | 30 | Very brittle. |
| B | 3 to 1 | 25 | Quite brittle. |
| C | 2 to 1 | 42 | Brittle and tough. |
| D | 1 to 1 | 49 | Somewhat flexible and tough. |
| E | 1 to 2 | 53 | Quite flexible and tough. |
| F | 1 to 3 | 105 | Very flexible and somewhat elastic. |
| G | 1 to 4 | 110 | Extremely flexible and elastic. |

An examination of the results set forth in the above table shows that when the ratio of resorcin to oil decreases substantially below the ratio of 1 of the resorcin to 2 of the oil, as, for example, 1 to 3 or 1 to 4, the curing time increases considerably such that the increase in curing time of the 1 to 3 ratio over the 1 to 2 ratio is almost 100%. Because of this relatively long curing period, use of reaction products produced from ratios of 1 of the resorcin to 3 of the oil and 1 of the resorcin to 4 of the oil, or proportions therebetween, is considerably limited from a commercial standpoint, since the time required for the cure is excessive, although a fairly satisfactory cure is obtained.

It is to be noted that test samples A to E inclusive cure in a considerably shorter curing period than test samples F to G, but that test samples A and B, wherein the ratio of resorcin to oil is 4 to 1 and 3 to 1, cured to products which are exceedingly brittle, so that on use they would crack, peel and disintegrate.

As has been previously pointed out, one of the objects of the present invention is the production of resinous compounds and of a resinous coating which are flexible and maintain said flexibility over long periods of time. The above tests conclusively prove that when the ratio of resorcin to oil is 4 to 1 and 3 to 1 the desired results are not obtained. The results set forth in the above table conclusively show that the critical ratios of resorcin to oil vary between about 2 of the resorcin to about 1 of the oil and about 1 of the resorcin to about 2 of the oil. Stated differently, the critical factors may be defined somewhat differently by stating that the resorcin may be reacted with about 50% of oil to about 200% of oil taken on the weight of the resorcin.

As herein set forth, the varnishes of the present invention may be employed in the manufacture of laminated paper and other fibrous material both organic and inorganic, such as glass cloth, asbestos, paper, cotton, rayon, silk, wool, and other textiles, thin sheets of wood and other cellulosic materials, and organic materials including leather, natural and synthetically-occurring rubber, and synthetic organic plastics, as, for example, nylon, that is, superpolyamides, Vinylites, cellulose derivatives, such as cellulose esters and ethers, including cellulose nitrate and acetate, and ethyl and methyl cellulose, polystyrene, and the like. Nylon may be defined as a fiber-forming polymeric amide having a protein-like chemical structure, and is usually derived from coal, air and water. It is characterized by extreme toughness and strength and by its ability to be shaped into sheets and similar articles. By reference there is incorporated herein the definition of nylon appearing in the Condensed Chemical Dictionary, third edition, 1942, pages 473 and 474. "Vinylite" is the brand name of synthetic thermoplastic resins available in four series, A, Q, V and X. Series A comprises polymerized vinyl acetate; series Q comprises polymerized vinyl chloride; series V comprises copolymerized vinyl chloride and vinyl acetate; and series X is typified by polyvinyl butyral. By reference there is incorporated herein the definition of "Vinylite" and the properties of series A, Q, V and X appearing in the Condensed Chemical Dictionary, supra, page 663.

Laminated articles, as, for example, laminated paper, may be prepared, as is well known in the art. Employing the resinous material of the present invention, the various steps comprise:

(a) Preparation of the varnish hereinbefore set forth;

(b) Impregnation of the laminae;

(c) The drying of the impregnated laminae;

(d) The precure of the laminae, as for example, 5 to 10 minutes at 90° C.;

(e) The cutting and stacking of the laminae;

(f) The hot pressing of the laminae, as, for example, in a $\frac{1}{8}$-inch panel for 10 to 15 minutes at about 135° to about 150° C.; and (g) Removing the finished article from the press.

It may also be pointed out that the products of the present invention may be employed as a binder for fibrous or other materials, such as sand, in the manufacture of cold-molded objects. As is well known, it is common to mix sand with a binding agent in the production of foundry cores. The mixed sand and binder is cold-molded in the shape of a core, and after cold-molding the core is placed in an oven and cured at a suitable temperature and for a suitable time such that the finished article will maintain its shape on handling.

While alcohol has been set forth as a suitable solvent medium for the oil-resorcin reaction product of the present invention, any of the prior art solvents used for dissolving the phenol vegetable oil reaction products may be used. In general, any of the aliphatic alcohols commonly used as solvents in place of denatured ethyl alcohol may be used, as, for example, methyl, propyl, butyl, and amyl alcohols. In other words, the lower and higher aliphatic alcohols may be used. Further, ketones and ketone substitution products may be used. Hydrocarbon solvents, such as benzol, toluol, xylol, and the like, or mixtures of these, may also be employed.

It is within the province of the present invention to select such a solvent medium for the oil-resorcin resinous reaction products that the resulting solution will be compatible with solutions of phenolic type resins, particularly those of the oil soluble type, the alkyd resins, and other organic polymers and elastomers, including natural and synthetic rubbers.

Instead of using hexamethylenetetramine as a setting agent, other equivalent setting agents may be used, as, for example, formaldehyde, paraformaldehyde, and reactive methylol compounds, as exemplified by trimethylolmelamine, dimethylol urea, and the like. All of these compounds liberate on solution or by heating, or a combination of solution and heating, reactive methylene-containing radicals or linkages capable of reacting with the resinous composition herein set forth to produce a hardened set-up product.

This application is a continuation in part of application Serial No. 384,203, filed March 19, 1941.

What is claimed is:

1. The method of preparing a resin-like coating composition, comprising heat-reacting resorcin with an oil selected from the group consisting of vegetable and animal oils containing 40% to 60% trilinolein and about 7½% to about 15% of concentrated sulphuric acid taken on the weight of the resorcin, the ratio of the resorcin to the oil varying from 1:3 to 3:1, the reaction mass being maintained at a temperature between about 175° C. and about 200° C. until the evolution of sulfur dioxide is substantially completed.

2. The method of preparing a resin-like coating composition, comprising heat-reacting resorcin with an oil selected from the group consisting of vegetable and animal oils containing 40% to 60% trilinolein and about 10% of concentrated sulphuric acid taken on the weight of the resorcin, the ratio of the resorcin to the oil varying from 1:2 to 2:1, said reaction mass being maintained at a temperature between about 175° C. and about 200° C. until the evolution of sulphur dioxide is substantially completed.

3. The method of preparing a resin-like coating composition, comprising heat-reacting resorcin with an oil selected from the group consisting of vegetable and animal oils containing 40% to 60% trilinolein and about 7½% to about 15% of concentrated sulphuric acid taken on the weight of the resorcin, the ratio of the resorcin to the oil varying from 1:2 to 2:1, said reaction mass being maintained at a temperature varying between 175° and 200° C. until the evolution of sulphur dioxide is substantially completed.

4. The method of preparing a heat-reactive resinous composition comprising heat-reacting resorcin with an oil selected from the group consisting of vegetable and animal oils containing 40% to 60% trilinolein and about 7½% to about 15% of concentrated sulphuric acid taken on the weight of the resorcin, the ratio of the resorcin to the oil varying from 1:2 to 2:1, the reaction mass being maintained at a temperature varying between about 175° C. and about 200° C. until the evolution of sulfur dioxide is substantially completed, dissolving the resulting reaction product in an organic solvent, and introducing into the resulting resin solution a potentially reactive methylene-containing hardening agent.

5. The method of preparing a heat-reactive resinous composition comprising heat-reacting resorcin with an oil selected from the group consisting of vegetable and animal oils containing 40% to 60% trilinolein and about 7½% to about 15% of concentrated sulphuric acid taken on the weight of the resorcin, the ratio of the resorcin to the oil varying from 1:2 to 2:1, the reaction mass being maintained at a temperature varying between about 175° C. and about 200° C. until the evolution of sulfur dioxide is substantially completed, dissolving the reaction product in an organic solvent, and introducing into the resulting resin solution for the purpose of reducing the curing time thereof hexamethylenetetramine dissolved in water in an amount which will inhibit the separation of the resin solution into layers of water and organic solvent-containing material, said hexamethylenetetramine being present in said resin solution in an amount varying between 2% to 20% taken on the weight of the resin solids present in said resin solution.

6. The method of claim 5 wherein the oil is soya bean oil.

7. The method of claim 5 wherein the oil is cotton seed oil.

8. The method of preparing a resin-like coating composition, comprising heat-reacting resorcin with cotton seed oil and about 7½% to about 15% of concentrated sulfuric acid taken on the weight of the resorcin, the ratio of the resorcin to the oil varying from about 1:2 to 2:1, said reaction mass being maintained at a temperature varying between about 175° C. and about 200° C. until the evolution of sulfur dioxide is substantially completed.

9. The method of preparing a resin-like coating composition, comprising heat-reacting resorcin with soya bean oil and about 7½% to about 15% of concentrated sulfuric acid taken on the weight of the resorcin, the ratio of the resorcin to the oil varying from about 1:2 to 2:1, said reaction mass being maintained at a temperature varying between about 175° C. and about 200° C. until the evolution of sulfur dioxide is substantially completed.

10. The method of preparing a resin-like coating composition, comprising heat-reacting resorcin with soya bean oil and about 7½% to about 15% of concentrated sulfuric acid taken on the weight of the resorcin, the ratio of the resorcin to the oil varying from about 1:2 to 2:1, said reaction mass being maintained at a temperature varying between about 175° C. and about 200° C. until the evolution of sulfur dioxide is substantially completed, dissolving the resulting reaction product in an organic solvent, and introducing into the resulting resin solution a potentially reactive methylene-containing hardening agent.

11. The method of preparing a heat-reactive resinous composition comprising forming a mixture of resorcin cotton seed oil and about 7½% to about 15% of concentrated sulfuric acid taken on the weight of the resorcin, the ratio of the resorcin to the oil varying from 1:2 to 2:1, heating the resulting mass at a temperature varying between about 175° C. and about 200° C. until the evolution of sulfur dioxide is substantially completed, dissolving the resulting reaction product in an organic solvent, and introducing into the resulting resin solution a potentially reactive methylene-containing hardening agent.

12. The method of preparing a heat-reactive resinous composition comprising heat-reacting resorcin with soya bean oil and about 7½% to about 15% of concentrated sulfuric acid taken on the weight of the resorcin, the ratio of the resorcin to the oil varying from 1:2 to 2:1, said reaction being maintained at a temperature varying between about 175° C. to about 200° C., until the evolution of sulfur dioxide is substantially completed, dissolving said reaction product in an organic solvent, and introducing into the resulting resin solution for the purpose of reducing the curing time thereof hexamethylenetetramine dissolved in water in an amount which will inhibit the separation of the resin solution into layers of water and organic solvent-containing material, said hexamethylenetetramine being present in said resin solution in an amount varying between 2% to 20% taken on the weight of the resin solids present in said resin solution.

13. The method of preparing a heat-reactive resinous composition comprising heat-reacting resorcin with cotton seed oil and about 7½% to about 15% of concentrated sulfuric acid taken on the weight of the resorcin, the ratio of the resorcin to the oil varying from 1:2 to 2:1, said reaction being maintained at a temperature varying between about 175° C. to about 200° C., until the evolution of sulfur dioxide is substantially completed, dissolving said reaction product in an organic solvent, and introducing into the resulting resin solution for the purpose of reducing the curing time thereof hexamethylenetetramine dissolved in water in an amount which will inhibit the separation of the resin solution into layers of water and organic solvent-containing material, said hexamethylenetetramine being present in said resin solution in an amount varying between 2% to 20% taken on the weight of the resin solids present in said resin solution.

14. The product of the method of claim 3.
15. The product of the method of claim 4.
16. The product of the method of claim 8.
17. The product of the method of claim 9.
18. The product of the method of claim 10.
19. The product of the method of claim 11.
20. The product of the method of claim 12.
21. The product of the method of claim 13.
22. The product of the method of claim 1.

ARTHUR J. NORTON.